United States Patent [19]

Franklin

[11] Patent Number: 4,819,263
[45] Date of Patent: Apr. 4, 1989

[54] APPARATUS AND METHOD FOR HANDS FREE TELEPHONIC COMMUNICATION

[75] Inventor: Philip G. Franklin, San Clemente, Calif.

[73] Assignee: Cellular Communications Corporation, Houston, Tex.

[21] Appl. No.: 880,298

[22] Filed: Jun. 30, 1986

[51] Int. Cl.[4] ............................................. H04M 9/08
[52] U.S. Cl. .................................... 379/390; 379/388; 381/94
[58] Field of Search ............... 379/406, 407, 408, 409, 379/388, 389, 390, 61; 370/30, 32.1, 32; 455/42, 43, 47; 381/94, 71

[56] References Cited

U.S. PATENT DOCUMENTS

| | | | |
|---|---|---|---|
| 3,089,920 | 5/1963 | Law | 455/47 X |
| 3,622,714 | 11/1971 | Berkley et al. | 379/406 X |
| 3,678,390 | 7/1972 | Iwasaki et al. | 455/43 |
| 3,784,747 | 1/1974 | Berkley et al. | 379/388 |
| 3,922,488 | 11/1975 | Gabr | 381/94 |
| 4,019,140 | 4/1977 | Swerdlow | 455/47 X |
| 4,134,069 | 1/1979 | Shiki | 455/47 X |
| 4,400,584 | 8/1983 | Vilmur | 379/61 X |
| 4,424,593 | 1/1984 | Kahn | 455/47 |
| 4,528,656 | 7/1985 | Morais | 370/30 |
| 4,543,665 | 9/1985 | Sotelo et al. | 379/388 X |
| 4,554,679 | 11/1985 | Schiff | 455/47 X |
| 4,625,083 | 11/1986 | Poikela | 381/71 X |
| 4,641,339 | 2/1987 | Stottlemyer | 379/391 |
| 4,649,505 | 3/1987 | Zinser, Jr. et al. | 381/94 X |

FOREIGN PATENT DOCUMENTS

| | | | |
|---|---|---|---|
| 0107872 | 7/1939 | Australia | 455/42 |
| 0156430 | 12/1980 | Japan | 455/47 |

Primary Examiner—Jin F. Ng
Assistant Examiner—Randall S. Vaas
Attorney, Agent, or Firm—George F. Bethel; Patience K. Bethel

[57] ABSTRACT

Hands-free two-way communication is achieved, without the necessity of selectively muting either the sent or received signal and without the generation of interfering acoustical feedback between the speaker and microphone at the hands-free station, by frequency offsetting the audio signal sent from the hands-free station. The audio signal is frequency offset by first modulating the audio signal at a first carrier frequency to produce modulated upper and lower sideband outputs. The modulated upper sideband output is filtered out, and the modulated lower sideband output is coupled to the input of a demodulator. The modulated lower sideband output is then demodulated at a second carrier frequency offset from the first carrier frequency by a predetermined amount. A demodulated upper sideband output and lower sideband output is thus generated. The demodulated upper sideband output is filtered out, and the demodulated lower sideband output is provided for transmission or broadcast in the two-way communication. The demodulated lower sideband output is identical to the original input audio signal with the exception that it has been frequency offset by an amount equal to the predetermined amount of frequency offset between the first and second carrier frequencies. In the event of cross-talk or any feedback within the two-way communication loop, each transmission of the information is thus frequency offset, and the establishment of interfering feedback loops is thereby avoided.

9 Claims, 2 Drawing Sheets

APPARATUS AND METHOD FOR HANDS FREE TELEPHONIC COMMUNICATION

BACKGROUND OF THE INVENTION

1. Field of the Invention

The invention relates to the field of telephonic communication and, in particular, to hands-free operation wherein a speaker phone is utilized.

2. Description of the Prior Art

Conventional telephonic conversations occur through telephone handsets or headsets wherein the audio transmitter and audio receiver are acoustically decoupled. In the case of a conventional telephone handset, the acoustical coupling between the earpiece and mouthpiece, given the respective audio volumes produced at the earpiece or mouthpiece, are such that the amount of feedback introduced into the communicational loop is de minimis. In other words, in a conventional handset the audio volume received at the earpiece is not picked up at the mouthpiece at a magnitude great enough to form an interfering feedback loop in the two-way telephone conversation. In the case of a conventional headset, the acoustical separation between the earpiece and mouthpiece is even greater since the earpiece generally is tightly fitted to the wearer's ear and connected to the mouthpiece only through a thin plastic tube.

However, in the case of a hands-free or speaker phone operation, the audio signal intensity produced by the speaker is generally within the same order of magnitude as the audio signals produced by the user at the microphone pick-up. This is true even in the case where the speaker and microphone are physically separable, since the intensity of the audio signal from the speaker must be great enough to be easily heard by the user, and the microphone must be sensitive enough to pick up audio signals at reasonable audio voice levels. In order to avoid the inherent feedback which would otherwise occur, hands-free speakers contain automatic voice muting circuitry. Thus, when an audio signal is being produced at the speaker, the microphone is disabled. In addition, in some units, if an audio signal beyond a predetermined threshold is picked up at the microphone from the user, the audio signal to the speaker is cut off. Therefore, it is generally impossible in an hands-free operation to have any degree of overlap in conversations. Furthermore, the switchover or muting operation generally takes a few tenths of seconds to operate, which makes rapid interchange of conversation between the caller and receiver difficult.

More significantly, the use of hands-free operation must occur in a relatively quiet environment. Any background noise of significant magnitude will serve to activate the muting operation, thereby substantially interfering with, or disabling, the conversation of one of the parties. Hands-free speaker phone operation cannot therefore be used in noisy environments.

What is needed then is some means whereby hands-free operation of a telephone may be practiced in a noisy environment wherein loud distant noises can be distinguished from closer sounds, such as the speaker's voice.

BRIEF SUMMARY OF THE INVENTION

The invention is an improvement in a method for practicing hands-free two-way communication comprising the steps of modulating audio signals at a first carrier frequency to produce a modulated upper sideband and modulated lower sideband output; removing the upper sideband output; demodulating the lower sideband output at a second carrier frequency to produce a demodulated upper sideband output and demodulated lower sideband output, the second carrier frequency offset from the first carrier frequency by a predetermined amount; and removing the demodulated upper sideband output. As a result of this combination of steps interfering feedback by multiple transmissions through the two-way communication of an audio signal is substantially eliminated.

The improvement further comprises the step of limiting the audio signal to frequencies below the first or second carrier frequencies or both prior to the step of modulating.

The method further comprises the steps of receiving an acoustic audio signal at a pair of approximately adjacent microphones to generate a corresponding pair of electrical audio signals, and differentially amplifying the electrical audio signals to generate the input audio signal. As a result the acoustic audio signals originating near the pair of microphones are distinguished from acoustic audio signals generated distantly from the pair of microphones and the distant acoustic audio signals are substantially attenuated.

The step of receiving the acoustic audio signals at the pair of microphones is such that the signals are received preferentially along a predetermined direction.

The steps of modulating and demodulating the first and second carrier frequencies are offset relative to each other by an amount in the range of 0 to 500 Hz.

The invention can also be characterized as an apparatus for hands-free operation in two-way communication comprising a modulator for receiving an input audio signal and a first carrier oscillator coupled to the modulator. The first carrier oscillator generates a first carrier frequency. The input audio signal is mixed with the first carrier frequency to produce a modulated upper sideband output and lower sideband output of the modulator. A first filter removes the modulated upper sideband output. A demodulator receives the modulated lower sideband output. A second carrier oscillator generates a second carrier frequency. The second carrier frequency is coupled to the demodulator. The demodulator generates a demodulated upper sideband output and demodulated lower sideband output. The first and second carrier frequency are relatively offset from each other by a predetermined amount. A second filter removes the demodulated upper sideband output. As a result interfering feedback within the hands-free two-way communication is eliminated.

The apparatus further comprises a third filter for removing all frequencies above the first and second carrier frequencies. The third filter has its output coupled to the input of the modulator. The input audio signal appears at the output of the third filter.

The apparatus further comprises a pair of approximately adjacent microphones for producing a corresponding pair of audio signals, and a differential amplifier having one input coupled to each of the microphones for receiving the pair of audio signals. The differential amplifier produces the input audio signal. Therefore, acoustical sources near the pair of microphones are distinguished from acoustical sources relatively distant from the pair of microphones. The signals which are from the distant acoustical source are attenuated.

In the illustrated embodiment each of the microphones is a directional microphone.

The invention is still further characterized as an improvement in a method for hands-free two-way communication between a first and second station. The improvement comprises the step of frequency shifting the audio signal sent from the first station to the second station by a predetermined amount relative to the audio signal originating at the first station. Thus, interfering feedback and hands-free communication at the first station is substantially eliminated.

Figure 1:
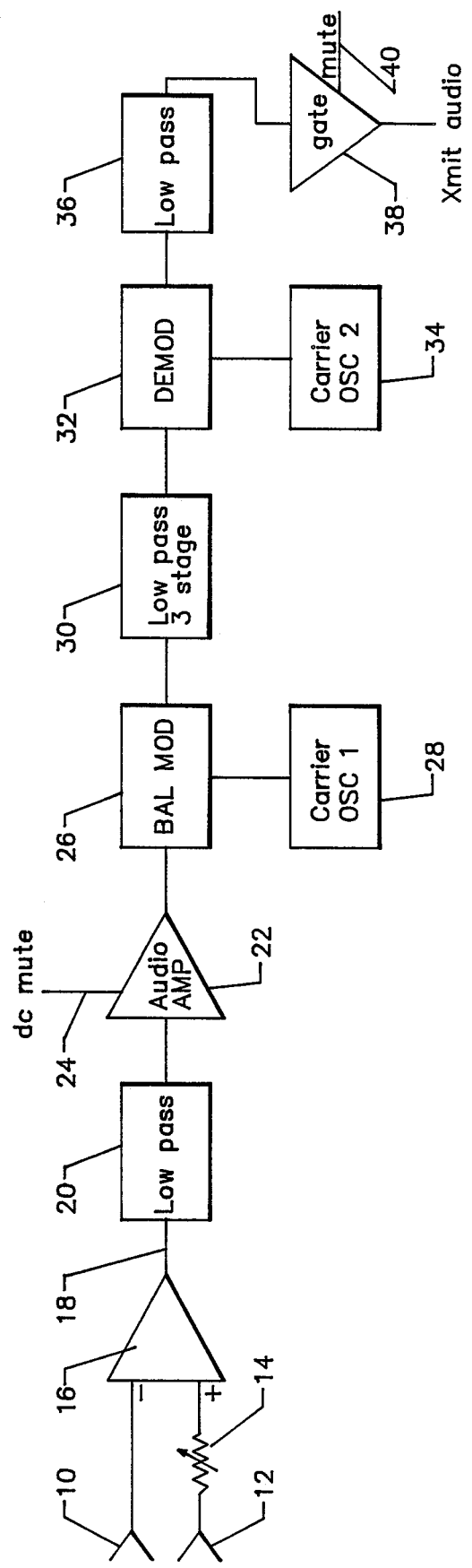
FIG. 1 is a diagrammatic depiction of circuitry incorporating the invention whereby hands-free operation in a noisy environment may be utilized.
Figure 2:
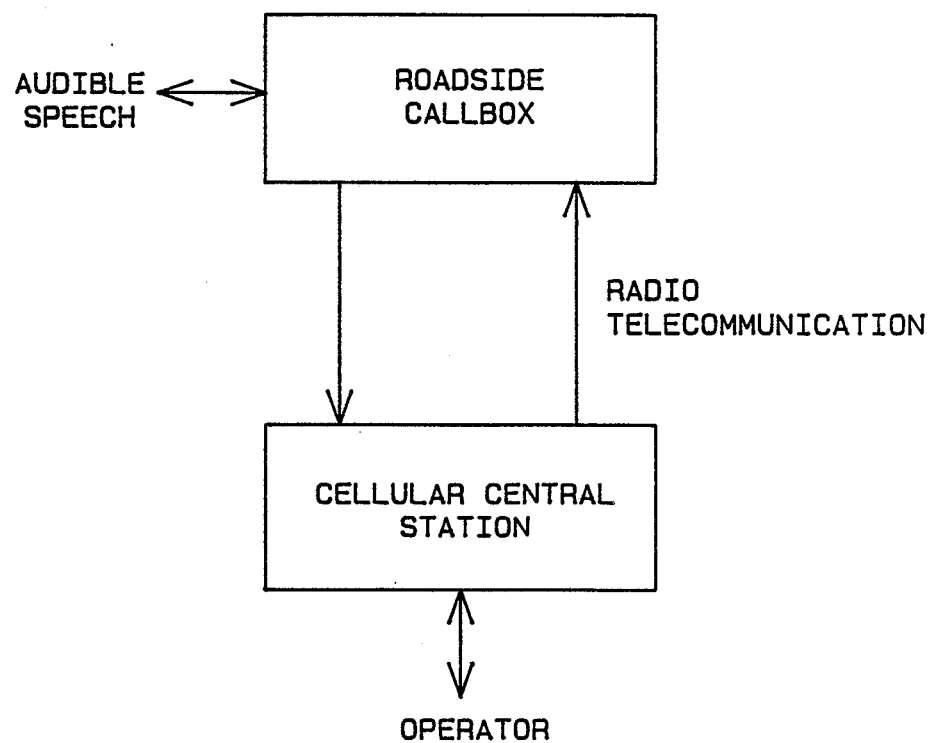
FIG. 2 is a diagrammatic depiction of an overall system in which the two-way hands free communication of the invention is illustrated.

The invention and its various embodiments may now be understood by turning to the following detailed description.

DETAILED DESCRIPTION OF THE PREFERRED EMBODIMENT

Hands-free two-way communication is achieved, without the necessity of selectively muting either the sent or received signal and without the generation of interfering acoustical feedback between the speaker and microphone at the hands-free station, by frequency offsetting the audio signal sent from the hands-free station. The audio signal is frequency offset by first modulating the audio signal at a first carrier frequency to produce modulated upper and lower sideband outputs. The modulated upper sideband output is filtered out, and the modulated lower sideband output is coupled to the input of a demodulator. The modulated lower sideband output is then demodulated at a second carrier frequency offset from the first carrier frequency by a predetermined amount. A demodulated upper sideband output and lower sideband output is thus generated. The demodulated upper sideband output is filtered out, and the demodulated lower sideband output is provided for transmission or broadcast in the two-way communication. The demodulated lower sideband output is identical to the original input audio signal with the exception that it has been frequency offset by an amount equal to the predetermined amount of frequency offset between the first and second carrier frequencies. In the event of cross-talk or any feedback within the two-way communication loop, each transmission of the information is thus frequency offset, and the establishment of interfering feedback loops is thereby avoided.

A pair of directional microphones are used to pick up a user's voice. The signal from each of the directional microphones is amplified in a differential amplifier so that distant signals are substantially canceled while nearby audio signals are amplified. The nearby audio signals, now transformed into an electrical signal, is further amplified through an audio amplifier, and coupled to the input of a double balanced modulator. The audio signal is mixed with a carrier oscillator, and appears in both upper and lower sidebands. The output of the double balanced modulator, containing the user's voice in upper and lower sidebands, is then coupled to a low pass, three stage filter. The lower sideband s transmitted to a double balanced demodulator. The lower sideband is then demodulated at a slightly offset carrier frequency to produce a demodulated lower and upper sideband signals, but offset by the difference in frequency of the carrier oscillators in the demodulator and the modulator. The output of the demodulator is then coupled to a low pass filter. The lower sideband, offset by the difference in the carrier frequencies, is provided at the output of the filter. This signal is then available for transmission.

A speaker in the vicinity of the pick-up microphones produces an audio signal which is received by the microphones. However, the signal, which is ultimately generated by the above-described circuitry, is frequency offset from that produced by the speaker by predetermined amount. Any amount of crosstalk or cross coupling within the telephone communication line therefore fails to set up a regenerative feedback since a signal, recirculating through the communication loop, is frequency offset during each cycle. Interfering feedback therefore is never established. There need be no muting circuitry within the hands-free communication system. Therefore, the occurrence of a loud extrinsic noise does not serve to interfere or cut off transmission of signals through the microphone or the speaker.

In the presently illustrated embodiment, the hands-free operation is described a connection with a roadside emergency callbox utilizing a hands-free telephone module which communicates through a remotely powered cellular radio telephone to conventional telephone land lines, as described in greater detail in connection with copending application entitled Apparatus and Method for a Cellular Freeway Emergency Telephone Service, filed Nov. 25, 1985, Ser. No. 801,410.

Turn now to the diagrammatic depiction of the circuitry as set forth in FIG. 1. Directional microphones 10 and 12 are conventional, and are mounted within the face of a roadside speaker box (not shown) at or near mouth level. Directional microphones 10 and 12 are placed immediately next to each other, or at least in close proximity to each other. Therefore, acoustical wavefronts impinging upon the speakers from nearby objects are likely to have dramatically different acoustical phases inasmuch as the distance of separation between microphones 10 and 12 is a large fraction of the total distance between the average position of the microphones and the source of the acoustical wavefront. On the other hand, acoustical wavefronts originating at distant sources are substantially more planar when arriving at microphones 10 and 12, and have very nearly the same phases at each of the microphones, since the distance of separation between microphones 10 and 12 is then an insignificant fraction of the total distance between the microphones and the distant source. The outputs of microphones 10 and 12 are coupled, through appropriate buffer circuitry, which is diagrammatically depicted by variable resistor 14, to the inputs of a differential amplifier 16. Since the signals from distant sources will have nearly the same phase, they will be canceled within differential amplifier 16. On the other hand, signals received from relatively nearby sources will have dramatically different phases, and thus produce an amplified audio output at output 18 of differential amplifier 16. Output 18 of amplifier 16 is coupled to a low pass filter 20. Low pass filter 20 substantially filters out all frequencies above a first predetermined frequency. The first predetermined frequency, for reasons described below, is set slightly below a first carrier oscillator frequency, also more completely described below.

For the purposes of illustration and clarity, assume that the first predetermined frequency is 3.5 kHz. Therefore, low pass filter 20 filters out all frequencies above 3.5 kHz and freely passes frequencies below 3.5 kHz. The first carrier oscillator frequency, in this illustrative example, is 4.0 kHz.

The output of low pass filter 20 is coupled to the input of an audio amplifier 22. Audio amplifier 22 is a mutable amplifier having a DC input 24, which can be selectively activated by the remote receiver for purposes of communication control. The muting capability of amplifier 22 does not relate to or affect the hands-free operation.

The output of amplifier 22 is coupled in turn to the input of a double balanced modulator 26 which, in the illustrative embodiment, is based upon switched capacitor filters, and in particular is a balanced modulator model No. MC1596, manufactured by Motorola Corporation. Balanced modulator 26 is coupled to a first carrier oscillator 28, which operates in the illustrative embodiment at 4.0 kHz. The audio signals input to balanced modulator 26 are thus mixed with the carrier frequency, and upper and lower sidebands are created at the output of balanced modulator 26.

The upper and lower sidebands, representing the filtered audio signal from microphones 10 and 12, are then coupled to the input of a three stage, low pass filter 30 which sharply and completely filters out all the upper sideband frequencies. For example, in the illustration, low pass filter 30 will have a sharp cutoff at 3.5 kHz of approximately 24-26 db per octave.

The audio signals are now presented at the output of low pass filter 30 as lower sideband signals only carried on the 4.0 kHz first carrier frequency of oscillator 28. These lower sideband signals are then coupled to the input of a double balanced demodulator 32. In the illustrative embodiment, demodulator 32 is a demodulator model No. MC1536, manufactured by Motorola Corporation. Demodulator 32 is coupled to a second carrier oscillator 34, which is operating at a second carrier frequency slightly offset from the first carrier frequency. Again, in the illustrative embodiment, the carrier frequency of oscillator 34 is assumed to be 4.1 kHz. The output of demodulator 32 thus represents the demodulated conversion of the modulated output signals from modulator 26. However, since the carrier frequency of demodulator 32 is slightly offset from the carrier frequency of modulator 26, the demodulated signals form upper and lower sidebands are offset by a similar frequency offset.

The output of demodulator 32 is coupled to a low pass filter 36 which filters out the upper sideband of the demodulated signals. The lower sideband represents the demodulated offset signals which correspond, subject only to the frequency offset of the carriers, to the frequencies of the original audio signals received by microphones 10 and 12. The output of low pass filter 36 is coupled to gate 38 which is controlled by a mute signal input 40. The output of gate 38 is a logically controlled offset audio signal available for transmission or broadcast according to conventional means. As in the case with audio amplifier 22, gate 38 is controlled by remote commands received according to considerations which are irrelevant to hands-free operation.

The circuit architecture having been described in connection with the diagrammatic depiction of FIG. 1 can better be understood by now considering the operation of the circuitry of FIG. 1 in the context of a simple example. Assume that audio frequencies between the range of 1,000 and 2,000 Hz are generated by a user at the roadside callbox at microphones 10 and 12. These near signals are thus amplified by differential amplifier 16, and pass through low pass filter 20. They are amplified by audio amplifier 22 presented as inputs to balanced modulator 26. The output of balanced modulator will produce both the sum and difference between the input and carrier signals at its output. For example, a 2 kHz and 1 kHz signal to input of balanced modulator 26 will produce the sum frequencies 6 kHz and 5 kHz at the output, as well as the difference frequencies, 2 kHz and 3 kHz. The upper sideband is represented by 5 and 6 kHz signals, and the lower sideband is represented by 2 and 3 kHz signals. If a signal greater than the carrier frequency, such as a 6 kHz signal, were presented to the input of balanced modulator 26, the sum and difference signals would be a 2 kHz and 10 kHz signal. In this case there would be no way in which to distinguish the 2 kHz signal produced from the difference between the 6 kHz signal and the carrier, and the 2 kHz signal produced between the difference between the 2 kHz signal and the carrier. This frequency mixing would lead to information garbling, and is thus avoided by filtering out all signals near, at or above the carrier frequency. In the illustrated embodiment, a margin of safety and clear separation between the upper and sidebands are created by filtering out all frequencies above 3.5 kHz.

Low pass filter 30 is thus used to filter out the 5 and 6 kHz upper sideband signals and to pass the 2 and 3 kHz lower sideband signals. The lower sideband signals are thus presented to the input of demodulator 32. However, in demodulator 32, the 2 and 3 kHz sideband signals are mixed with a 4.1 kHz carrier signal. Thus, the output of demodulator 32 is comprised of the sum frequencies 7.1 kHz and 6.1 kHz and the difference frequencies, 2.1 and 1.1 kHz. The 6.1 and 7.1 kHz signals thus represent the upper sideband while the 2.1 and 1.1 kHz signals represent the lower sideband.

Again, the upper sideband signals are filtered out by low pass filter 36. The resulting audio signals coupled through gate 38 are signals at 1.1 and 2.1 kHz. These are in fact the initial audio signals we have assumed were received by microphones 10 and 12, but offset by the amount of difference in the carrier frequencies between carrier oscillators 28 and 34.

Thus, the listener or receiver at the other end of microphones 10 and 12 will hear the speaker's voice offset by small frequency differential. However, the frequency offset is not sufficient to lose any significant intelligibility, and in the case of an emergency roadside callbox, there is no need or desirability to reproduce the speaker's voice with high fidelity. On the other hand, when the receiver transmits to the speaker at the callbox, his voice is transmitted through the callbox at a nearby speaker at a volume sufficient to be heard at roadside noise levels, and therefore at a volume of the same order of magnitude as the caller himself.

The remote receiver's voice is thus picked up upon microphones 10 and 12. The signal is amplified by the circuitry of FIG. 1 with the same degree as any other nearby audio signal. However, the receiver's voice is offset by the difference between the carrier frequencies of oscillators 28 and 34. Therefore, any crosstalk which occurs at any point within the telephone communication loop is rapidly escalated in frequency as it is multiply transmitted through the communication loop with the result that no interfering feedback is established.

Particular note should be made of the fact that at no point within the circuitry of FIG. 1 is it necessary to mute the operation of microphones 10 and 12 or any nearby speaker in order to utilize the hands-free operation. As the caller is using the roadside box in hands-free operation, the passage of a loud, nearby truck or other noise will, firstly, tend to be ignored by the directional nature of microphones 10 and 22, and, secondly, tend to be canceled, at least when relatively distant, by the differential amplification of the output of microphones 10 and 12. In any case, the passing of a large, nearby noise in direct line with microphones 10 and 12 will not serve to cut or mute the operation of any nearby speaker, and the caller will be freely to communicate with the remote receiver without interference. At the same time, the remote receiver will be able to clearly communicate with the caller in a hands-free mode without the creation of interfering feedback loops.

Many modifications and alterations may be made by those having ordinary skill in the art without departing from the spirit and scope of the invention. For example, in the illustrated embodiment above, for simplicity and clarity it was assumed that the first and second carrier oscillator frequencies were at 4.0 and 4.1 kHz. However, any carrier frequencies could have been selected as may be desired, as well as their relative offset. In the presently preferred embodiment, the first carrier frequency is 4.0000 kHz, while the second carrier frequency is set at 4.01024 kHz. It has generally been determined according to the invention that carrier frequency offsets in the range of 0+ to 20 Hz do not substantially degrade the intelligibility of the caller's voice, while such an offset at the same time provides sufficient inhibition against the establishment of interfering feedback loops. The closer the carrier frequencies are to each other, the greater is the fidelity of the caller's voice signal, and the greater the tendency to create interfering feedback loops. Similarly, the further apart the carrier frequencies, the less is the fidelity to the caller's voice, and less tendency there is to the generation of interfering feedback loops. In practice, a frequency separation between the carrier oscillators of approximately 5 to 20 Hz provides a practical optimum.

Therefore, the illustrative embodiment must be understood only as an example, and not as a limitation of the invention, which is defined in the following claims.

I claim:

1. An improvement in a method for suppressing feedback in a hands-free two-way communication between a first and second station comprising the steps of:
    receiving an acoustic audio signal at a pair of approximately adjacent microphones to generate a corresponding pair of electrical audio signals;
    differentially amplifying said electrical audio signals to generate a hands-free originated signal,
    modulating said hands-free originated signal at a first carrier frequency to produce a modulated upper sideband and modulated lower sideband signal at said first station;
    removing said upper sideband signal by filtering out any signal above a predetermined frequency corresponding to said lower sideband signal;
    demodulating said lower sideband signal at a second carrier frequency to produce a demodulated sideband signal and a demodulated lower sideband signal, said second carrier frequency being greater than said first frequency by a predetermined amount;
    removing said demodulated upper sideband signal,
    transmitted said demodulated lower sideband signal to said second station as an output transmission signal,
    wherein at least a portion of said output transmission signal is fed back as an interfacing signal from said second station and/or from along the transmission path between said first and second stations to said first station, and
    repeating said steps of modulating said hands-free originated signal, removing said upper sideband signal, demodulating said lower sideband signal and removing said demodulated upper sideband signal so that said interfering feedback signal retransmitted as part of said output transmission signal to s second station is frequency offset and therefore substantially reduced in amplitude on each cycled transmission through said first station,
    whereby acoustic audio signals originating near said pair of microphones are distinguished from acoustic audio signals generated distant from said pair of microphones, said distantly generated acoustic audio signals being substantially attenuated, and
    whereby interfering feedback by multiple transmissions of said output transmission signal through said hands-free two-way communication is substantially eliminated.

2. The improvement of claim 1 further comprising the steps of limiting said hands-free originated signal to frequencies below said first carrier frequency prior to said step of modulating.

3. The improvement of claim 1 wherein said steps of modulating and demodulating said first and second carrier frequencies are offset relative to each other by an amount in the range of 5 to 20 Hz.

4. An improvement in an apparatus feedback suppression in hands-free operation in full-duplex two-way communication comprising:
    a switched capacitor modulator having an input for receiving a hands-free originated audio signal;
    a first carrier oscillator coupled to said modulator, said first carrier oscillator generating a first carrier frequency, said hands-free originated audio signal being mixed with said first carrier frequency to produce a modulated upper sideband output and modulated lower sideband output of said modulator;
    a first filter for removing frequencies above a predetermined maximum corresponding to said modulated lower sideband output;
    a switched capacitor demodulator for receiving said modulated lower sideband output;
    a second carrier oscillator for generating a second carrier frequency, said second carrier frequency coupled to said demodulator, said demodulator generating a demodulated upper sideband output and demodulated lower sideband output, said second carrier frequency greater than said first carrier frequency predetermined amount; and
    a second filter for removing said demodulated upper sideband output,
    whereby interfering feedback within said hands-free two-way communication is reduced.

5. The improvement of claim 4 further comprising a third filter for removing all frequencies from said input audio above said first and second carrier frequencies, said filter having its output coupled to said input of said switched capacitor modulator, said hands-free audio signal appearing at said output of said third filter.

6. The improvement of claim 4 further comprising a pair of approximately adjacent microphones for producing a corresponding pair of audio signals, and a differential amplifier having one input coupled to each of said microphones for receiving said pair audio signals, siid differential amplifier producing said input audio signal; so that acoustic sources near said pair of microphones are distinguished from acoustic sources relatively distant from said pair of microophones. signals from said distant acoustic source being attenuated by differencing said pair of audio signals from said microphones in said differential amplifier.

7. The improvement of claim 5 further comprising a pair of approximately adjacent microphones for producing a corresponding pair of audio signals, and a differential amplifier having one input coupled to each of said microphones for receiving said pair of audio signals, said differential amplifier producing said input audio signal, so that acoustic sources near said pair of microphones are distinguished from acoustic sources relatively distant from said pair of microphones, signals from said distant acoustic source being attenuated by differencing said pair of audio signals from said microphones in said differential amplifier.

8. The improvement of claim 4 wherein first carrier frequency and said second carrier frequency are offset relative to each said predetermined amount is in the range of 0+ to 500 Hz.

9. The improvement of claim 5 wherein said predetermined amount is in the range of 0+ to 500 Hz.

* * * * *